(12) United States Patent
Jue (10) Patent No.: US 7,152,846 B1
(45) Date of Patent: Dec. 26, 2006

(54) GRIPPING TOOL WITH ORTHOGONAL HANDLES

(76) Inventor: Jeffrey Matthew Jue, 375 Van Buren Ave., Apt. 27, Oakland, CA (US) 94610

( * ) Notice: Subject to any disclaimer, the term of this patent is extended or adjusted under 35 U.S.C. 154(b) by 0 days.

(21) Appl. No.: 11/299,530

(22) Filed: Dec. 12, 2005

(51) Int. Cl.
*H02G 1/08* (2006.01)
(52) U.S. Cl. ............................................. 254/134.3 FT
(58) Field of Classification Search ....... 254/134.3 FT, 254/134.3 R
See application file for complete search history.

(56) References Cited

U.S. PATENT DOCUMENTS

| 1,624,556 | A | * | 4/1927 | Marshall | 29/21.1 |
| 2,638,805 | A | * | 5/1953 | Bigelow | 269/3 |
| 2,671,310 | A | * | 3/1954 | Noack | 59/7 |
| 5,423,517 | A | * | 6/1995 | Rausch | 254/134.3 FT |
| 6,530,566 | B1 | * | 3/2003 | DuVernay | 269/228 |

* cited by examiner

*Primary Examiner*—Lee D. Wilson
(74) *Attorney, Agent, or Firm*—Mark J. Spolyar (57) ABSTRACT

A gripping tool having a handle oriented orthogonally to the plier jaws to facilitate various operations, such as pulling a wire through a drawplate.

16 Claims, 7 Drawing Sheets

GRIPPING TOOL WITH ORTHOGONAL HANDLES

FIELD OF THE INVENTION

The present invention relates to a drawtongs or gripping tool device used to grip and pull a substrate, such as a wire through a drawplate.

BACKGROUND OF THE INVENTION

In the metal trades and arts, it is sometimes necessary to decrease the diameter of, lengthen, straighten, or change the shape of metal wire. This can be accomplished by a cold forming process that does not use heat to change the shape of the metal. For example, the metal wire can be pulled through holes in a drawplate. As the wire is pulled through a hole smaller than its circumference, it is forced to take on the size and shape of the hole. Metal workers grip the wire with drawtongs to pull it through the drawplate. The force required to draw wire can limit both which tasks can be accomplished and which personnel can accomplish the tasks.

The strength required for pulling a metal wire through a drawplate can be mitigated by the design of the drawtongs. Traditional drawtongs are held by gripping both hands around a handle inline with the pulling direction, like gripping the rope in a tug-of-war. The present invention is a novel gripping tool apparatus that places two handles approximately orthogonal to the direction of pulling. This allows each hand to grasp a handle, like grasping bike handlebars. This position is more ergonomic, allowing the metalworker a firm, comfortable grip for a uniform, horizontal pulling motion. The design of the traditional drawtongs requires the user to squeeze the handles to grip the wire and then pull the tongs to draw the wire. The orientation of the actuator in the present invention allows the pulling action itself to create a gripping force.

In one possible use of the present invention, a metalworker can create a pointed end on the wire to allow a portion of the wire to pass through the drawplate and protrude out of the opposite side. He or she can then place the protruding end of the wire between the plier jaws of the gripping tool. Using the actuator, he or she can clamp the wire firmly between the plier jaws. The actuator may be locked into closed position or may be designed in such a way that the act of grasping the handles to pull the wire keeps the actuator in the closed position. The worker then grasps the handles, one in each hand, and tugs firmly to pull the wire through the drawplate hole. The circumference of the wire will have taken on the size and shape of the hole, provided that the hole is smaller than the original circumference of the wire.

SUMMARY OF THE INVENTION

The present invention relates to a gripping tool having a handle oriented orthogonally to the plier jaws to facilitate various operations, such as pulling a wire through a drawplate. As set forth in more detail below, the present invention can be embodied in a variety of forms.

DESCRIPTION OF PREFERRED EMBODIMENT(S)

Figure 1:
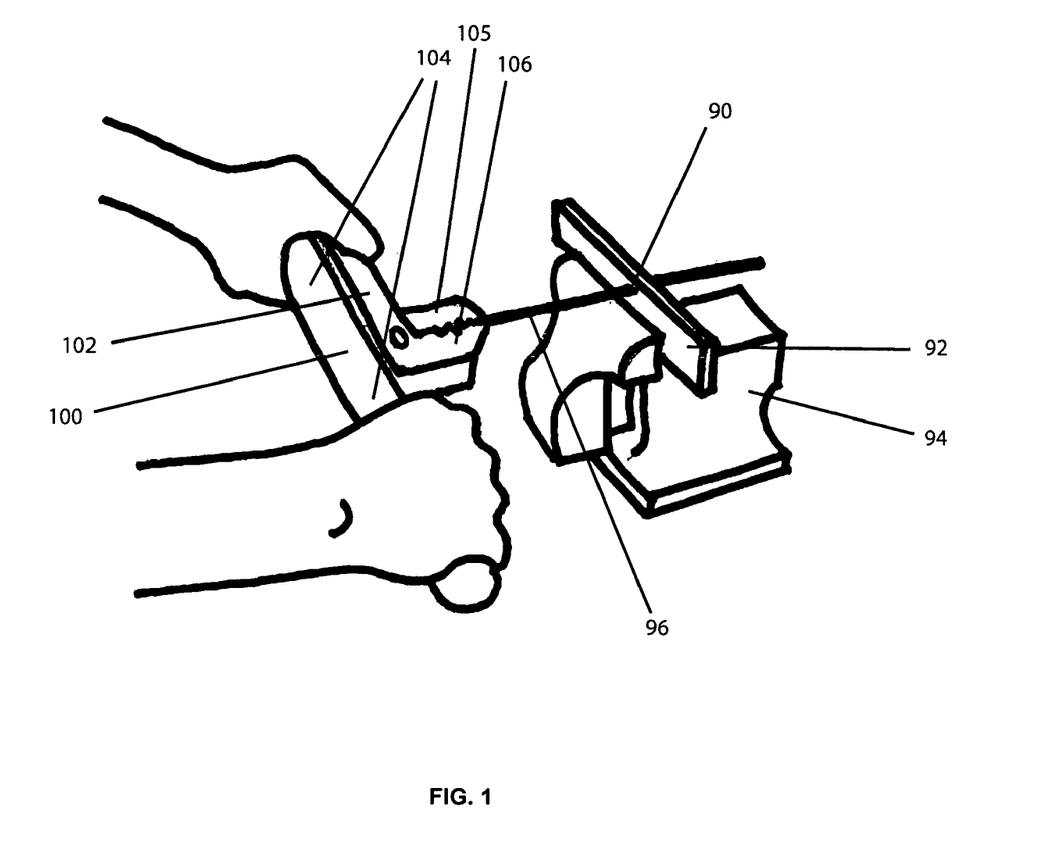
FIG. 1 illustrates an implementation of a gripping tool with orthogonal handles.

FIG. 1 illustrates an implementation of one embodiment of a gripping tool 100 with orthogonal handles. The gripping tool 100 is comprised of plier jaws 105 and 106, an actuator 102, and handles 104. The plier jaws 105 and 106, while in the closed position, grip the end of a wire 96 that is inserted through a drawplate 92 held vertically in a vise clamp 94. As the gripping tool 100 is pulled away from the drawplate 92, the wire 96 is pulled through a hole 90 in the drawplate 92. The wire 96 takes on as its circumference the size and shape of the hole 90. Of course, use of gripping tool 100 is not limited to the application illustrated in FIG. 1.

Figure 2:
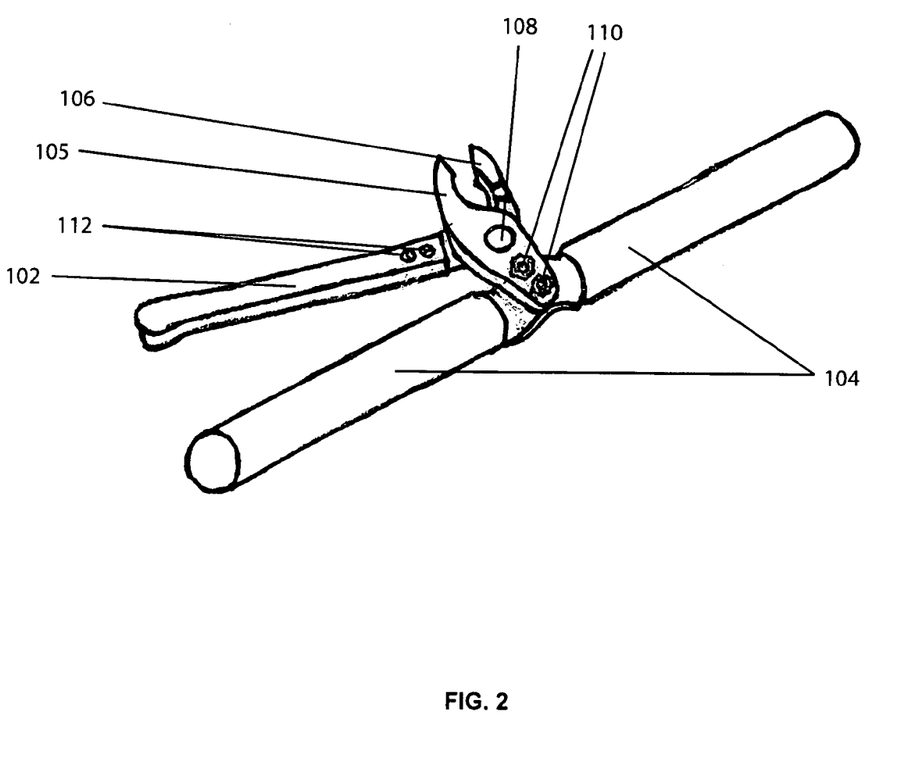
FIG. 2 illustrates an embodiment of a gripping tool with orthogonal handles.

FIG. 2 illustrates one embodiment of the present invention. In this embodiment, the gripping tool 100 is comprised of plier jaws 105 and 106 pivotally connected to one another as shown, an actuator lever 102, and handles 104. The plier jaws 105 and 106 can pivot around a joint 108 to achieve an open position, wherein the tips of the plier jaws 105 and 106 are spaced apart, and a closed position, wherein the tips of the plier jaws 105 and 106 are close together to grip an object such as a wire. A wire or other object can be positioned between the plier jaws 105 and 106 while in open position then gripped between the plier jaws 105 and 106 in closed position. The inside surface of the plier jaws 105 and 106 may be textured to grip the wire more firmly. The fixed plier jaw 105, may be attached, for example by bolts 110, to the handles 104. The moveable plier jaw 106 may be attached, for example by screws 112, to the actuator lever 102. When the actuator lever 102 is pulled toward the handle 104, the moveable plier jaw 106 moves toward the fixed plier jaw 105, into the closed position. In this and the other embodiments, the plier jaws (105 and 106 in FIG. 2) and actuator (102 in FIG. 2) can be made of steel or other metals, and the handles (104 in FIG. 2) can be made of steel, aluminum tubing, other metals, wood, PVC tubing, plastics, or other materials. The handles (104 in FIG. 2) may have sleeves made of rubber, fabric, or other material.

Figure 3:
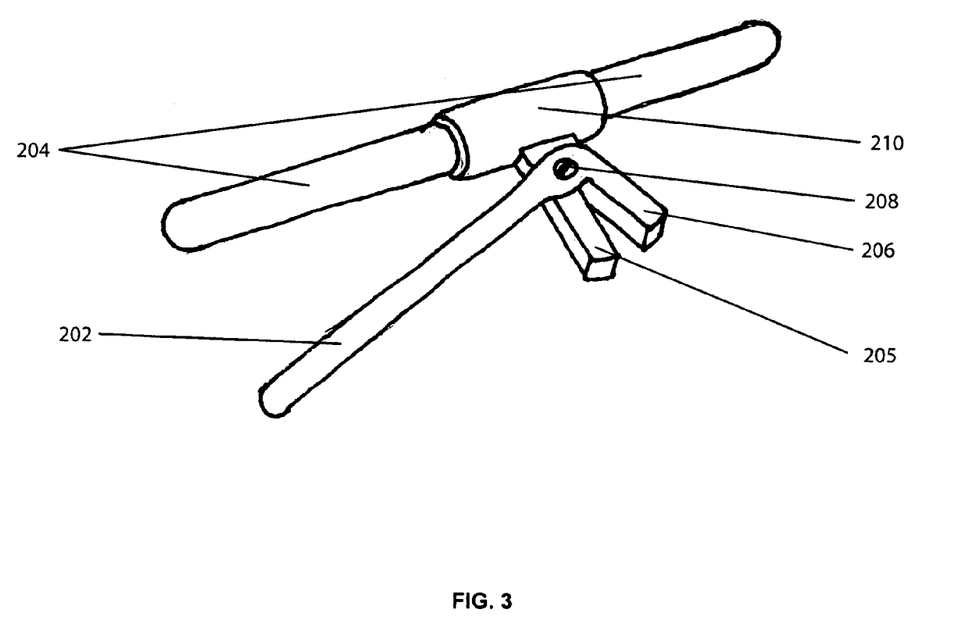
FIG. 3 illustrates another embodiment of a gripping tool with orthogonal handles, wherein the handle is a thick dowel.

FIG. 3 illustrates an alternative embodiment of the present invention, wherein the handle 204 of the gripping tool is a thick dowel that extends through a tubular fitting or clamp from which one of the plier jaws extends. In this embodiment, the actuator lever 202 and moveable plier jaw 206 are integrally formed. The fixed plier jaw 205 attaches to the dowel handle 204 by a clamp 210. In one implementation, the dowel handle 204 can be attached to the fixed plier jaw by a press-fit. In another implementation, the fixed plier jaw 205 and the tubular claim 210 are integrally formed. These two pieces operably assemble via a pivot peg 208. Moving the actuator lever 202 toward the handle 204 causes the plier jaws 205 and 206 to converge into closed position. Holding the actuator lever 202 against the handle 204 while pulling secures the wire between the plier jaws 205 and 206.

Figure 4A:
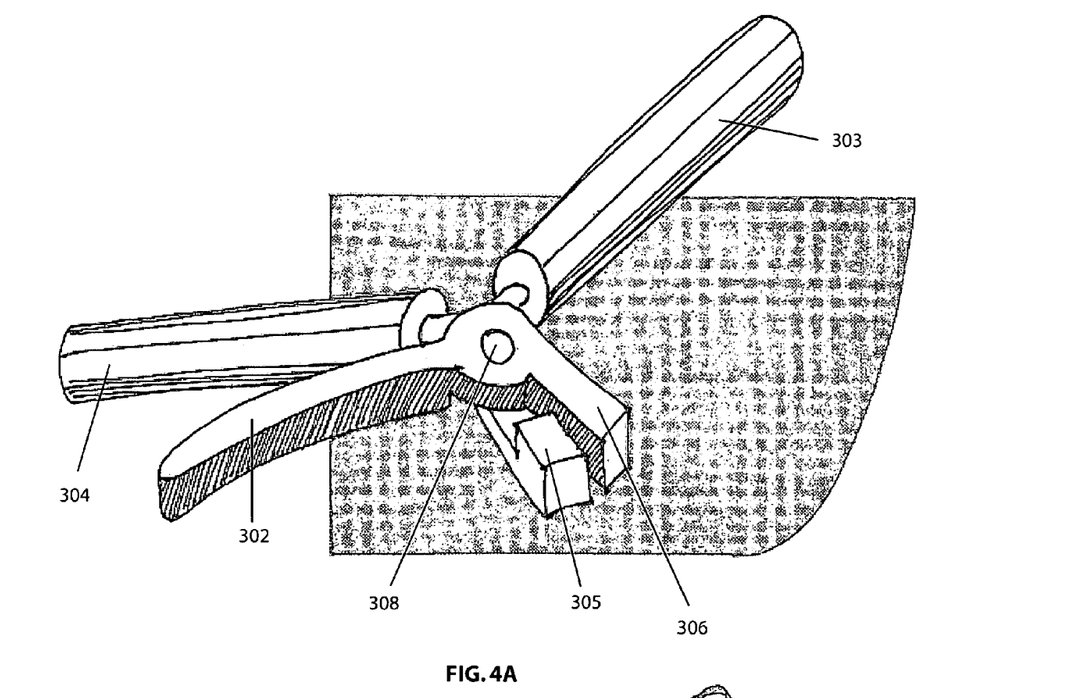
FIGS. 4A and 4B illustrate an embodiment of a two-piece gripping tool with orthogonal handles.
Figure 4B:
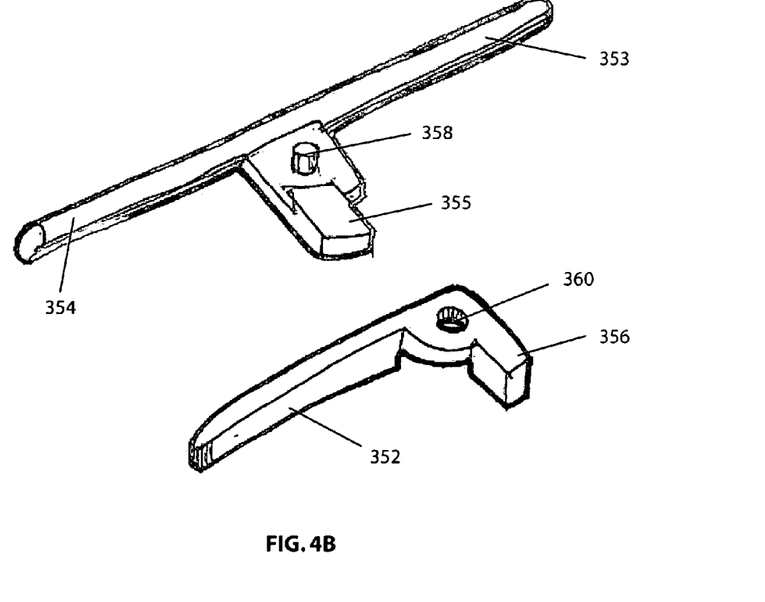

FIGS. 4A and 4B illustrate other embodiments of the present invention, wherein the gripping tool is comprised of two pieces. As shown in FIG. 4A, the two pieces fit together to form plier jaws 305 and 306, an actuator lever 302, and handles 303 and 304. One piece contains the handles 303 and 304, the fixed plier jaw 305, and a pivot peg 308 that serves as a pivot joint. The second piece contains the moveable plier jaw 306, the actuator lever 302, and a pivot hole 310 for the pivot peg 308. When the actuator lever 302 is pulled toward the handle 304, the plier jaws 305 and 306 close. The actuator lever 302 can be easily held against the handle 304, which holds the plier jaws 305 and 306 in the closed position as the wire is pulled. The embodiment shown in FIG. 4A has handles 303 and 304 oriented at angles, while the embodiment in FIG. 4B has straight handles 353 and 354. The embodiment represented in FIG. 4B consists of two integrally formed pieces, shown separately. One piece contains the handles 353 and 354, the fixed plier jaw 355, and a pivot peg 358. The second piece contains the moveable plier jaw 356, the actuator lever 352, and a pivot hole 360. The two pieces assemble by inserting the pivot peg 358 into the pivot hole 360. A bolt or rivet head formed at the top of the pivot peg 358 secures the moveable plier jaw 356 to the fixed plier jaw 355. In another implementation, both jaws may each hove a hole through which a bolt extends. A nut attaches to the bolt to secure the moveable and fixed plier jaws.

Figure 5:
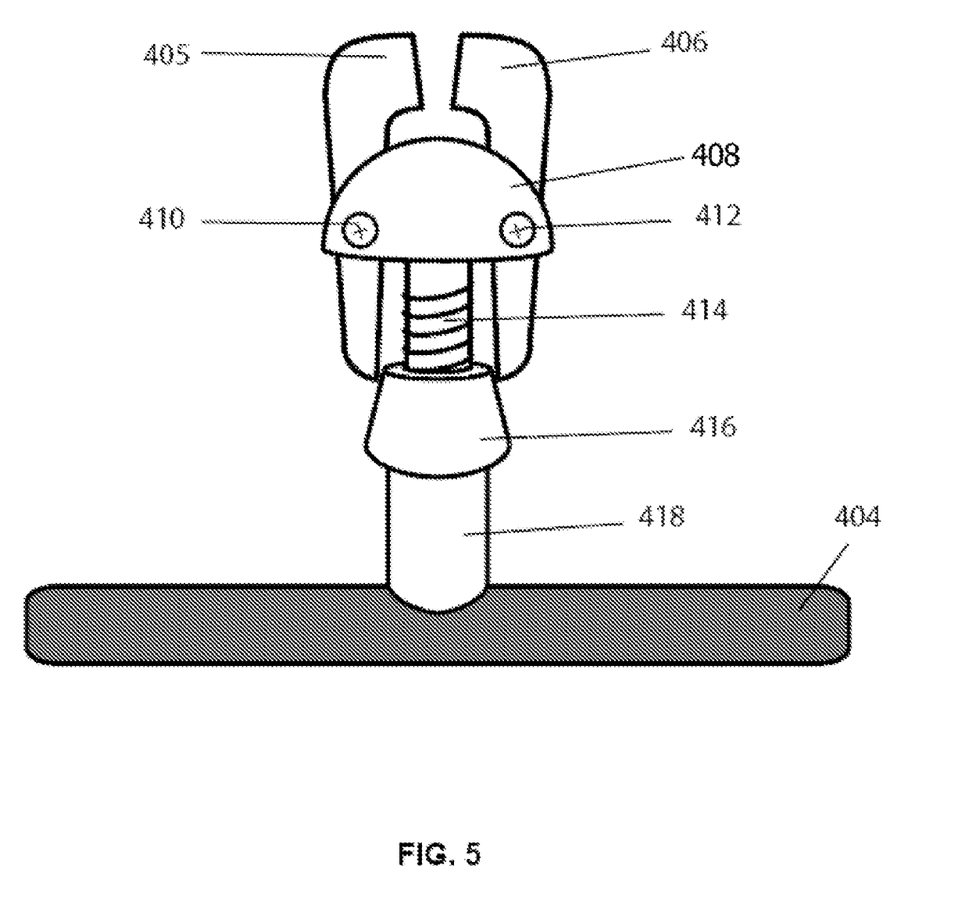
FIG. 5 illustrates an embodiment of a vise gripping tool with orthogonal handles.

Other embodiments of the present invention can utilize other types of actuators than a lever to move the plier jaws between the open and closed positions. FIG. 5 illustrates an embodiment of the present invention that uses a vise to open and close the plier jaws. In this embodiment, the handle 404 is orthogonally connected to a shaft 418. Along the same axis as the shaft 418 is a vise screw 414 that can be adjusted for length by turning it into or out of the shaft 418. The other end of the vise screw 414 is a pivot head 408, in which the plier jaws 405 and 406 are attached via two pivot joints 410 and 412. As the vise screw 414 gets shorter, a ramp piece 416 attached to the shaft 418 moves toward the pivot head 408. As the exposed length of the vise screw 414 shortens, the ramp piece 416 forces the ends of the plier jaws 405 and 406 outward. The outward movement causes the plier jaws 405 and 406 to pivot at the pivot joints 410 and 412 and the plier jaw heads to come together into closed position. A wire may be tightly clamped between the pier jaws as the user grasps the handle 406 and pulls.

Figure 6:
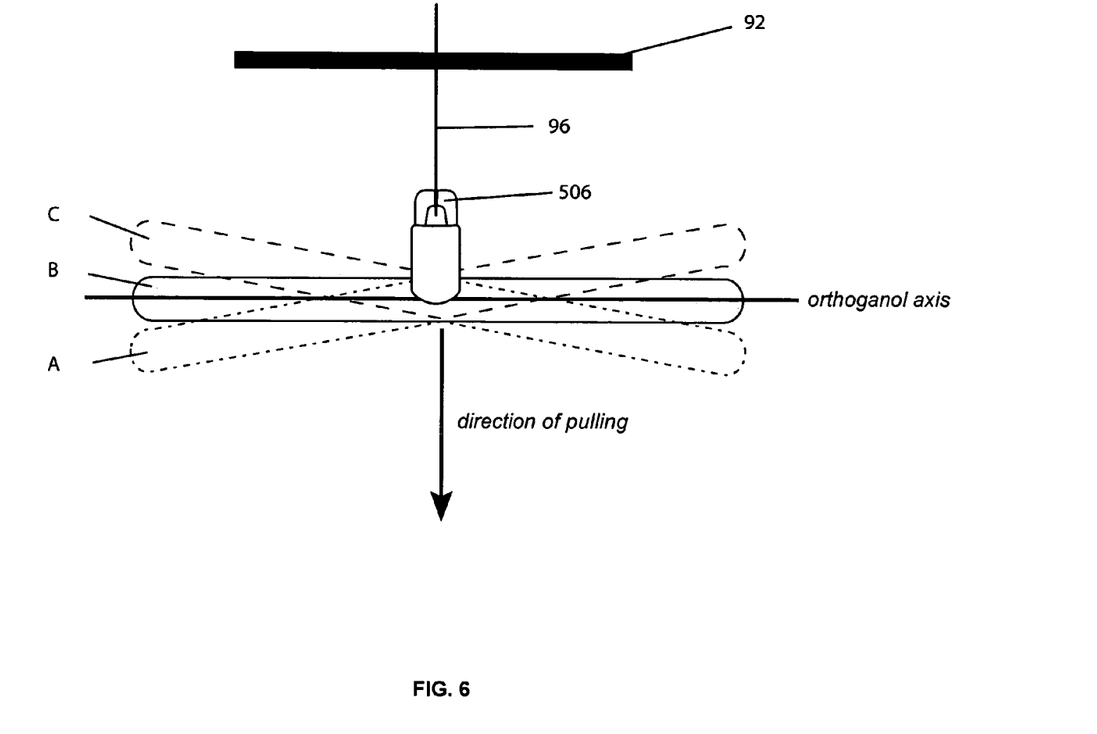
FIG. 6 illustrates possible orientations of orthogonal handles relative to the plier jaws.

Modifications of the present invention can include a variety of geometries for the orthogonal handles, as FIG. 6 illustrates. The handles can be perpendicular (B) to the line defined by the wire 96 and direction of pulling. The handles may also be angled or curved toward (C) or away from (A) the plier jaws 506.

Figure 7:
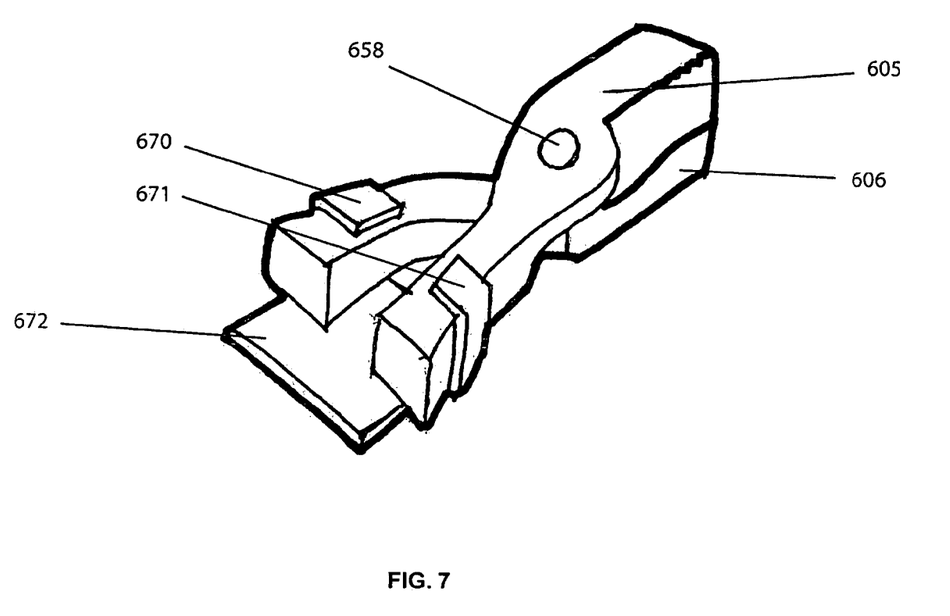
FIG. 7 illustrates a modification of the gripping tool according to another implementation of the present invention.

The present invention may also be modified to allow the pulling action to create a gripping force. FIG. 7 illustrates a plier jaw actuation assembly where the pulling action creates the force that closes the plier jaws against the wire being pulled. For illustrative purposes only, FIG. 7 omits illustration of the handle. The plier jaws 605 and 606 clamp the substrate by pivoting around a pivot joint 658. Clamp arms 670 and 671, extending from plate 672, hold the plier jaws 605 and 606 in closed position against the wire as the user pulls the wire through a substrate. That is, the pulling action initiated by the user causes the clamp arms 670, 671 to force the plier jaws to apply a greater closing force. The pliers attach to a handle via the plate 672.

While preferred embodiments of this invention have been shown and described above, it will be apparent to those skilled in the art that various modifications may be made in these embodiments without departing from the spirit and scope of the present invention. For example, variations of the dimensions of various elements describe above are contemplated and fall within the scope of the present invention. In addition, embodiments of the present invention can be adapted to a variety of applications, such as wire, cable, or tube pulling and/or straightening operations. In addition, embodiments of the present invention may operate on a variety of substrates, such as wire, cable, tubes, wire rope, flat wire, metal strips, and the like. Other embodiments of the present invention will be apparent to one of ordinary skill in the art. It is, therefore, intended that the claims set forth below not be limited to the embodiments described above.

What is claimed is:

1. A gripping tool apparatus, comprising:
   first and second plier jaws movable from an open to a closed position;
   an actuator for moving the plier jaws wherein the actuator is substantially orthogonal to the second plier jaw;
   a handle comprising a bar attached to at least the first plier jaw in an orientation substantially orthogonal to the first plier jaw wherein the handle is shaped for grasping by a human hand; wherein the actuator extends substantially parallel to the handle; and wherein the handle extends from both sides of the plier jaws.

2. The gripping tool apparatus of claim 1 wherein the actuator is a lever arm.

3. The gripping tool apparatus of claim 2 wherein the actuator lever arm is positioned such that when the lever is substantially parallel to the handle, the plier jaws are in a substantially closed position.

4. The gripping tool apparatus of claim 1 wherein the handle is oriented in a straight line substantially orthogonal to the first plier jaw.

5. The gripping tool apparatus of claim 1 wherein the handle is angled relative to a perpendicular line substantially orthogonal to the first plier jaw.

6. The gripping tool apparatus of claim 1 wherein the handle is curved relative to a perpendicular line substantially orthogonal to the first plier jaw.

7. The gripping tool apparatus of claim 1 wherein the actuator comprises first and second clamp arms disposed to force the first and second plier jaws together as a pulling force is applied to an object held between the first and second plier jaws.

8. The gripping tool apparatus of claim 1 wherein at least one of the first and second plier jaws are textured for increased grip.

9. A hand tool with plier jaws, comprising:
   a first plier jaw connected to a handle in an orientation substantially orthogonal thereto wherein the handle is shaped for grasping by a human hand;
   a second plier jaw operably connected to a lever wherein the lever is substantially orthogonal to the second plier jaw;
   a connector disposed to allow the first and second plier jaws to pivot relative to one another; wherein the handle comprises a bar; the lever extends substantially parallel to the handle; and wherein the handle extends from both sides of the first and second plier jaws.

10. The hand tool of claim 9 wherein the second plier jaw and the lever are connected by being integrally formed.

11. The hand tool of claim 9 wherein the second plier jaw and the lever are connected by securing a plier jaw piece to a lever piece.

12. The hand tool of claim 9 wherein the first plier jaw is connected to the handle by being integrally formed.

13. The hand tool of claim 9 wherein the first plier jaw and the handle are connected by securing a plier jaw piece to a handle piece.

14. The hand tool of claim 9 wherein the connector is a peg and hole pivot.

15. The hand tool of claim 9 wherein the connector is a bolt.

16. The hand tool of claim 9 wherein the connector is a rivet.

\* \* \* \* \*